United States Patent
Yeh

(10) Patent No.: US 9,983,698 B2
(45) Date of Patent: May 29, 2018

(54) CAPACITIVE STYLUS SIGNAL TRANSMITTING AND APPLICATION METHOD AND CAPACITIVE STYLUS APPLYING THIS METHOD

(71) Applicant: WALTOP INTERNATIONAL CORPORATION, Hsinchu (TW)

(72) Inventor: Chia-Jui Yeh, Taipei (TW)

(73) Assignee: Waltop International Corporation, Hsinchu (TW)

( * ) Notice: Subject to any disclaimer, the term of this patent is extended or adjusted under 35 U.S.C. 154(b) by 46 days.

(21) Appl. No.: 15/349,756

(22) Filed: Nov. 11, 2016

(65) Prior Publication Data
US 2018/0095554 A1    Apr. 5, 2018

(30) Foreign Application Priority Data

Oct. 5, 2016    (TW) ............... 105132126 A

(51) Int. Cl.
| | |
|---|---|
| G06F 3/03 | (2006.01) |
| G06F 3/0354 | (2013.01) |
| G06F 3/044 | (2006.01) |
| G06F 3/038 | (2013.01) |
| G06F 3/041 | (2006.01) |

(52) U.S. Cl.
CPC ........ *G06F 3/03545* (2013.01); *G06F 3/0383* (2013.01); *G06F 3/041* (2013.01); *G06F 3/044* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 2011/0205191 A1* | 8/2011 | Hou | G06F 3/03545 345/179 |
| 2013/0088465 A1* | 4/2013 | Geller | G06F 3/03545 345/179 |
| 2013/0300719 A1* | 11/2013 | Wang | G06F 3/046 345/179 |
| 2015/0062091 A1* | 3/2015 | Li | G01S 5/186 345/177 |

* cited by examiner

*Primary Examiner* — Joseph Haley
(74) *Attorney, Agent, or Firm* — Donald E. Stout; Stout, Uxa & Buyan, LLP

(57) ABSTRACT

A capacitive stylus signal transmitting and application method and a capacitive stylus applying this method are disclosed. The capacitive stylus and the method use electric field signals from three different transmit electrodes to calculate the incline angle and the tip pressure level of the capacitive stylus.

14 Claims, 4 Drawing Sheets

CAPACITIVE STYLUS SIGNAL TRANSMITTING AND APPLICATION METHOD AND CAPACITIVE STYLUS APPLYING THIS METHOD

CROSS-REFERENCE TO RELATED APPLICATIONS

The entire contents of Taiwan Patent Application No. 105132126, filed on Oct. 5, 2016, from which this application claims priority, are expressly incorporated herein by reference.

FIELD OF THE INVENTION

The present invention relates to a capacitive stylus signal transmitting and application method and a capacitive stylus applying this method, and more particularly to a capacitive stylus signal transmitting and application method using three different electrodes to transmit electric field signals and a capacitive stylus applying this method.

DESCRIPTION OF THE PRIOR ART

Touch control technology using a capacitive stylus is a mainstream of touch input technology. Users can use capacitive styluses to perform writing input operations or to execute application programs through user interfaces upon a touch panel. A touch panel detects coordinates or orientations of a capacitive stylus via capacitive coupling established between detection electrodes of the touch panel and the capacitive stylus when the capacitive stylus approaches or contacts the touch panel. In order to establish capacitive coupling between detection electrodes and the capacitive stylus to obtain the coordinates of the capacitive stylus, the capacitive stylus must receive driving signals from the detection electrodes and output voltage signals to the detection electrodes. In addition to the coordinates of the capacitive stylus, information including incline angle, orientation or tip pressure level of the capacitive stylus is crucial data for functions and applications of the capacitive stylus upon the touch panel. The invention provides a capacitive stylus signal transmitting and application method and a capacitive stylus applying this method, which use three different electrodes to transmit electric field signals so as to calculate the incline angle and the tip pressure level of the capacitive stylus:

SUMMARY OF THE INVENTION

In one embodiment of the present invention, a capacitive stylus signal transmitting and application method is provided. The method comprises the following steps. First of all, a capacitive stylus on a touch panel, a capacitive stylus comprising a first transmit electrode, a second transmit electrode and a third transmit electrode is provided. Then strengths of electric field signals from the first transmit electrode and the third transmit electrode are detected. Next the strengths of electric field signals from the first transmit electrode and the third transmit electrode is compared. Then a first incline angle of the capacitive stylus according to a result of comparing the strengths of electric field signals from the first transmit electrode and the third transmit electrode is calculated. Next strengths of electric field signals from the first transmit electrode, the second transmit electrode and the third transmit electrode are detected. Then the strengths of electric field signals from the first transmit electrode and the third transmit electrode is compared, and the strengths of electric field signals from the second transmit electrode and the third transmit electrode is also compared. Next a second incline angle of the capacitive stylus is calculated according to results of comparing the strengths of electric field signals from the first transmit electrode and the third transmit electrode and comparing the strengths of electric field signals from the second transmit electrode and the third transmit electrode. Finally, an incline angle of the capacitive stylus is calculated according to the first incline angle and the second incline angle.

In another embodiment of the present invention, a capacitive stylus with three transmit electrodes is provided. The capacitive stylus comprises a circuit board with a circuit thereon, a first transmit electrode, a second transmit electrode, a third transmit electrode, and an non-transitory computer readable medium on the circuit board. The first transmit electrode is adjacent to a tip of the capacitive stylus, and the third transmit electrode is configured to be located between the first transmit electrode and the second transmit electrode. The non-transitory computer readable medium stores executing computer readable instructions for performing a capacitive stylus signal transmitting method. The capacitive stylus signal transmitting method comprises transmitting a first alternating electric field signal with a first frequency by the first transmit electrode and a third alternating electric field signal with a third frequency by the third transmit electrode, wherein the second transmit electrode does not transmit any signal during a first time slot; transmitting the first alternating electric field signal with the first frequency by the first transmit electrode, a second alternating electric field signal with a second frequency by the second transmit electrode and the third alternating electric field signal with the third frequency by the third transmit electrode during a second time slot; and transmitting a fourth alternating electric field signal with a fourth frequency by the first transmit electrode and the third alternating electric field signal with the third frequency by the third transmit electrode, wherein the second transmit electrode does not transmit any signal during a third time slot.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the scale of each component may not be expressly exactly.

In embodiments of the invention, some features related to a capacitive stylus which are not essential to the invention and are well known for any person skilled in the art to make and use the same will not be described in detail herein. For example, the following features relating to a capacitive stylus and a touch panel are well known for any person skilled in the art to make and use the same. A capacitive stylus includes a conductive tip while a touch panel has a capacitive detection array with a plurality of detection electrodes, wherein the detection electrodes comprise transmit electrodes (Tx) and receiving electrodes (Rx). When a capacitive stylus is used upon a touch panel, the conductive tip of the capacitive stylus approaches or contacts the capacitive detection array of the touch panel, and the conductive tip of the capacitive stylus will establish capacitive coupling with the detection electrodes under or adjacent the capacitive stylus. The capacitive stylus outputs a signal to the detection electrodes under or adjacent the capacitive stylus. The output signal is detected after the touch panel scans the transmit electrodes and receiving electrodes to generate a detection signal so as to calculate and determine coordinates of the capacitive stylus. The capacitive detection array comprises a charge accumulation circuit, a capacitance modulation circuit, or other capacitance sensing methods known by those skilled in the art.

Figure 1:
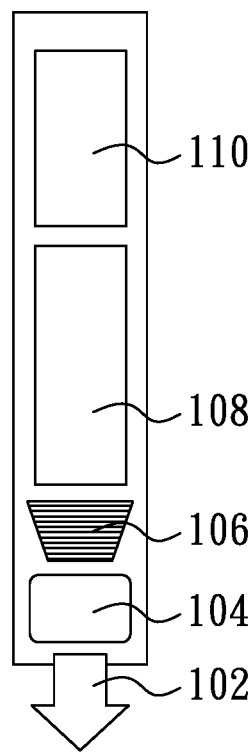
FIG. 1 is a schematic view of a capacitive stylus 100 applied upon a touch panel (not shown) according to one embodiment of the invention.

FIG. 1 is a schematic view of a capacitive stylus 100 applied upon a touch panel (not shown) according to one embodiment of the invention. As show in FIG. 1, in one preferred embodiment of the invention, the capacitive stylus 100 comprises a first transmit electrode (Tx1) 102, a second transmit electrode (Tx2) 106 and a third transmit electrode (TSL) 104. The first transmit electrode (Tx1) 102 and the second transmit electrode (Tx2) 106 comprise electrodes used to transmit alternating electric field signals. The third transmit electrode (TSL) 104 comprises an electrode used to transmit low frequency electric field signals. The capacitive stylus 100 further comprises a circuit board 108 with a capacitive stylus circuit and a battery 110 as the power source of the capacitive stylus 100. In this preferred embodiment, the incline angle of the capacitive stylus 100 on a touch panel is calculated by comparing the electric field signals of the first transmit electrode (Tx1) 102, the second transmit electrode (Tx2) 106 and the third transmit electrode (TSL) 104.

Figure 2:
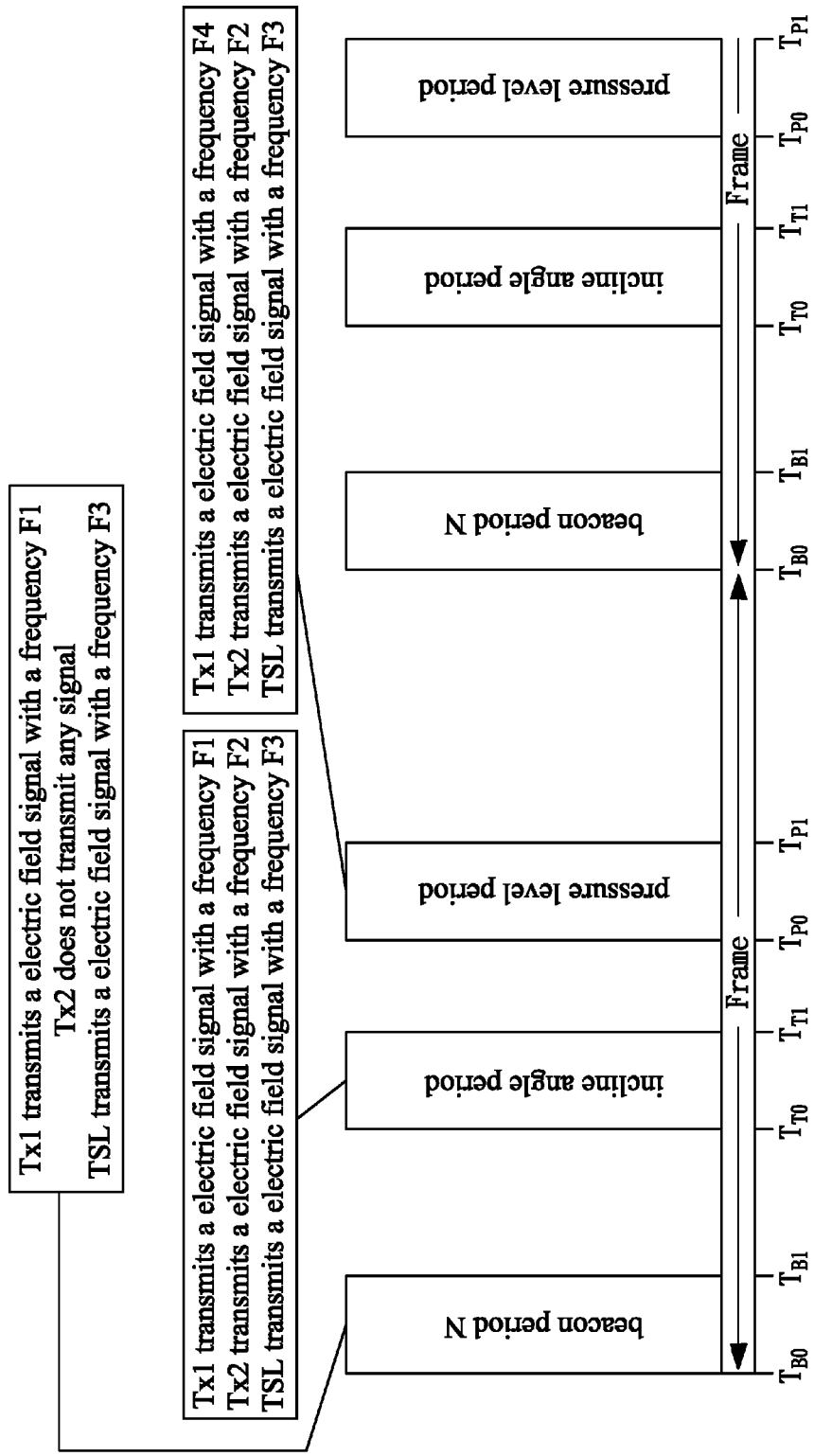
FIG. 2 is a schematic view of time slots of different electric field signals from three different transmit electrodes of a capacitive stylus upon a touch panel according to one embodiment of the invention.

FIG. 2 is a schematic view of time slots of different electric field signals from three different transmit electrodes of a capacitive stylus upon a touch panel according to one embodiment of the invention. In this embodiment, an initial time slot of different electric field signals from three different transmit electrodes are beacon period N. Beacon period N is from $T_{B0}$ to $T_{B1}$. During beacon period N, the first transmit electrode (Tx1) 102 transmits an alternating electric field signal with a frequency F1, and the third transmit electrode (TSL) 104 transmits a low frequency electric field signal with a frequency F3, while the second transmit electrode (Tx2) 106 does not transmit any signal. Then the first transmit electrode (Tx1) 102, the second transmit electrode (Tx2) 106 and the third transmit electrode (TSL) 104 do not transmit signal until period $T_{T0}$ to $T_{T1}$. During period $T_{T0}$ to $T_{T1}$, the first transmit electrode (Tx1) 102 transmits an alternating electric field signal with a frequency F1, the second transmit electrode (Tx2) 106 transmits an alternating electric field signal with a frequency F2, and the third transmit electrode (TSL) 104 transmits a low frequency electric field signal with a frequency F3. During time slot $T_{T0}$ to $T_{T1}$, the alternating electric field signal with a frequency F2 from the second transmit electrode (Tx2) 106 is an incline angle signal of the capacitive stylus 100 upon a touch panel.

The first transmit electrode (Tx1) 102, the second transmit electrode (Tx2) 106 and the third transmit electrode (TSL) 104 do not transmit signal until period $T_{P0}$ to $T_{P1}$. During period $T_{P0}$ to $T_{P1}$, the first transmit electrode (Tx1) 102 transmits an alternating electric field signal with a frequency F4, and the third transmit electrode (TSL) 104 transmits a low frequency electric field signal with a frequency F3, while the second transmit electrode (Tx2) 106 does not transmit any signal. During time slot $T_{P0}$ to $T_{P1}$, the alternating electric field signal with a frequency F4 from the first transmit electrode (Tx1) 102 is a pressure level signal of the capacitive stylus 100 upon a touch panel. Then the first transmit electrode (Tx1) 102, the second transmit electrode (Tx2) 106 and the third transmit electrode (TSL) 104 do not transmit signal until next beacon period N. In this preferred embodiment, the frequency F2 of the alternating electric field signal from the second transmit electrode (Tx2) 106 is larger than the frequency F1 of the alternating electric field signal from the first transmit electrode (Tx1) 102, and F2 is a multiple of F1. Moreover, the multiple is preferably in a range from 2 to 9. The frequency F1 of the alternating electric field signal from the first transmit electrode (Tx1) 102 is larger than the frequency F3 of the low frequency electric field signal from the third transmit electrode (TSL) 104, and F1 is a multiple of F3. The multiple is preferably more than 100.

The capacitive stylus signal transmitting and application method shown in FIG. 2 according to one embodiment of the invention can be performed by a firmware stored in an non-transitory computer readable medium such as a memory device of the capacitive stylus circuit on the circuit board 108. The non-transitory computer readable medium stores computer readable instructions which can perform the capacitive stylus signal transmitting and application method. The capacitive stylus signal transmitting and application method comprises the following steps. During period $T_{B0}$ to $T_{B1}$, the first transmit electrode (Tx1) 102 transmits an alternating electric field signal with a frequency F1, and the third transmit electrode (TSL) 104 transmits a low frequency electric field signal with a frequency F3, while the second transmit electrode (Tx2) 106 does not transmit any signal. During period $T_{T0}$ to $T_{T1}$, the first transmit electrode (Tx1) 102 transmits an alternating electric field signal with a frequency F1, the second transmit electrode (Tx2) 106 transmits an alternating electric field signal with a frequency F2, and the third transmit electrode (TSL) 104 transmits a low frequency electric field signal with a frequency F3. During time slot $T_{P0}$ to $T_{P1}$, the first transmit electrode (Tx1) 102 transmits an alternating electric field signal with a frequency F4, and the third transmit electrode (TSL) 104 transmits a low frequency electric field signal with a frequency F3, while the second transmit electrode (Tx2) 106 does not transmit any signal.

Figure 3:
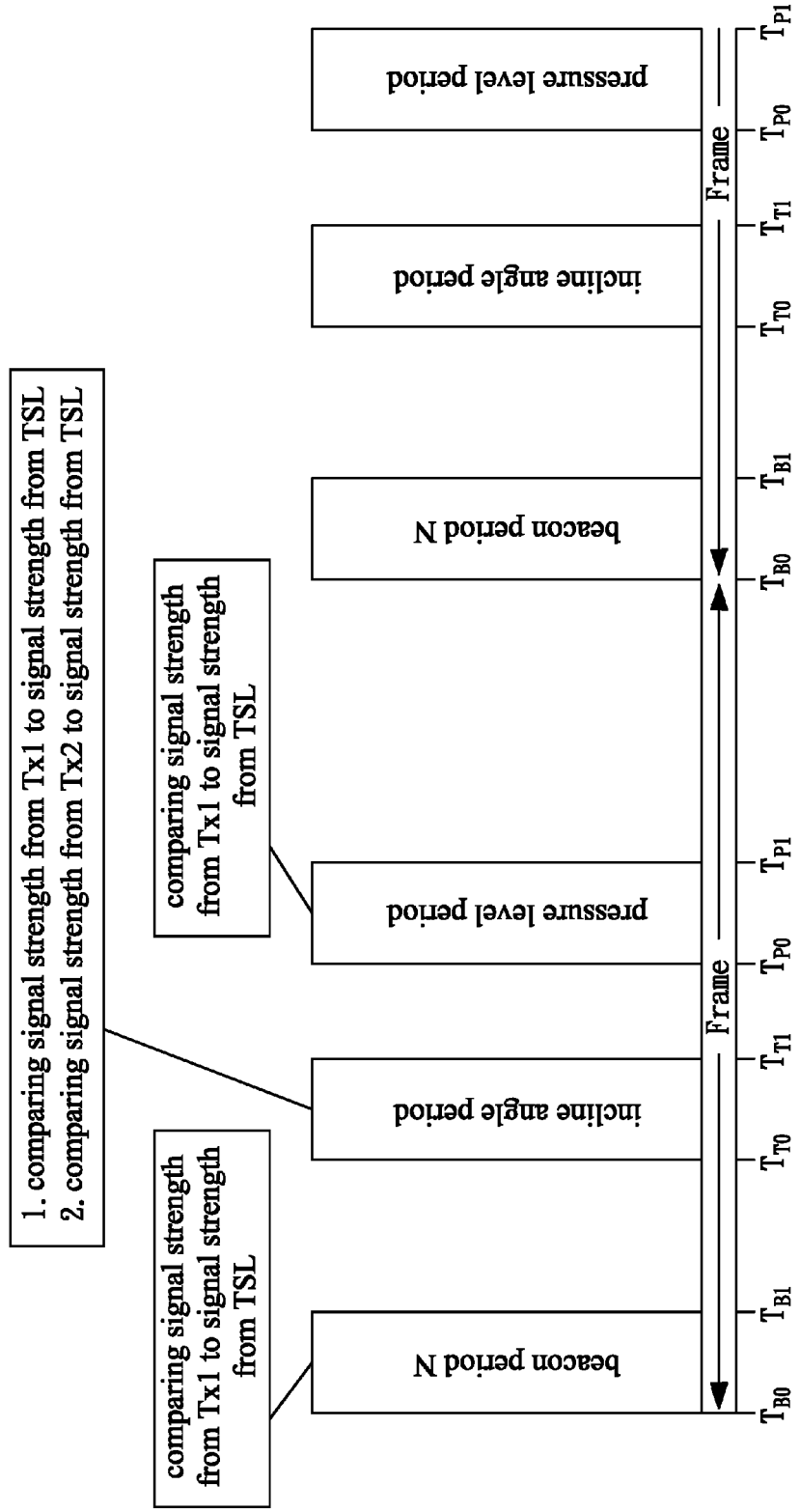
FIG. 3 is a schematic view of using different electric field signal strengths of three different transmit electrodes of a capacitive stylus to calculate an incline angle of the capacitive stylus upon a touch panel according to one embodiment of the invention.

FIG. 3 is a schematic view of using different electric field signal strengths of three different transmit electrodes of a capacitive stylus to calculate an incline angle of the capacitive stylus upon a touch panel according to one embodiment of the invention. In this embodiment, during beacon period N from $T_{B0}$ to $T_{B1}$, the capacitive detection array of the touch panel receives an alternating electric field signal with a frequency F1 from the first transmit electrode (Tx1) 102 and a low frequency electric field signal with a frequency F3 from the third transmit electrode (TSL) 104 transmits, and the second transmit electrode (Tx2) 106 does not transmit any signal. As shown in FIG. 1, the first transmit electrode (Tx1) 102 is closest to the capacitive detection array of the touch panel under a normal condition, while the third transmit electrode (TSL) 104 is second closest to the capacitive detection array of the touch panel, and the second transmit electrode (Tx2) 106 is farthest from the capacitive detection array. Therefore, the strength of the alternating electric field signal from the first transmit electrode (Tx1) 102 received by the capacitive detection array is strongest, while the strengths of the alternating electric field signals from the second transmit electrode (Tx2) 106 and the third transmit electrode (TSL) 104 are weaker. Moreover, the locations of the alternating electric field signals of the three electrodes on the touch panel also directly relate to the incline angle of the capacitive stylus upon the touch panel. The incline angle of the capacitive stylus upon the touch panel can be calculated via comparing the strength of the alternating electric field signal from the first transmit electrode (Tx1) 102 to the strengths of the alternating electric field signals from the second transmit electrode (Tx2) 106 and the third transmit electrode (TSL) 104 respectively.

In one embodiment of the invention, during beacon period N from $T_{B0}$ to $T_{B1}$, a first calculation of the incline angle of the capacitive stylus upon the touch panel can be performed through comparing the strength of the alternating electric field signal from the first transmit electrode (Tx1) 102 to the strength of the alternating electric field signal from the third transmit electrode (TSL) 104. Next during time slot $T_{T0}$ to $T_{T1}$, the capacitive detection array of the touch panel receives alternating electric field signals from the first transmit electrode (Tx1) 102, the second transmit electrode (Tx2) 106 and a low frequency alternating electric field signal from the third transmit electrode (TSL) 104 respectively. a second calculation of the incline angle of the capacitive stylus upon the touch panel can be performed through comparing the strengths of the alternating electric field signals from the first transmit electrode (Tx1) 102 and the second transmit electrode (Tx2) 106 to the strength of the alternating electric field signal from the third transmit electrode (TSL) 104 respectively. The comparison combinations of the strengths of the alternating electric field signals are not limited to the comparison between the strengths of the alternating electric field signals from the first transmit electrode (Tx1) 102 and the third transmit electrode (TSL) 104, and the comparison between the strengths of the alternating electric field signals from the second transmit electrode (Tx2) 106 and the third transmit electrode (TSL) 104. The calculation of the incline angle of the capacitive stylus upon the touch panel can also be performed through comparing the strength of the alternating electric field signal from the first transmit electrode (Tx1) 102 to the strength of the alternating electric field signal from the second transmit electrode (Tx2) 106.

Furthermore, during time slot $T_{P0}$ to $T_{P1}$, a calculation of a tip pressure level of the capacitive stylus on the touch panel can be performed through comparing the strength of the alternating electric field signal with a frequency F4 from the first transmit electrode (Tx1) 102 to the strength of the alternating electric field signal with a frequency F3 from the third transmit electrode (TSL) 104, while the second transmit electrode (Tx2) 106 does not transmit any signal.

The detections and comparisons of the strengths of the alternating electric field signals from the capacitive stylus, and the calculations of the incline angle and the tip pressure level upon the touch panel are performed by the touch panel.

Figure 4:
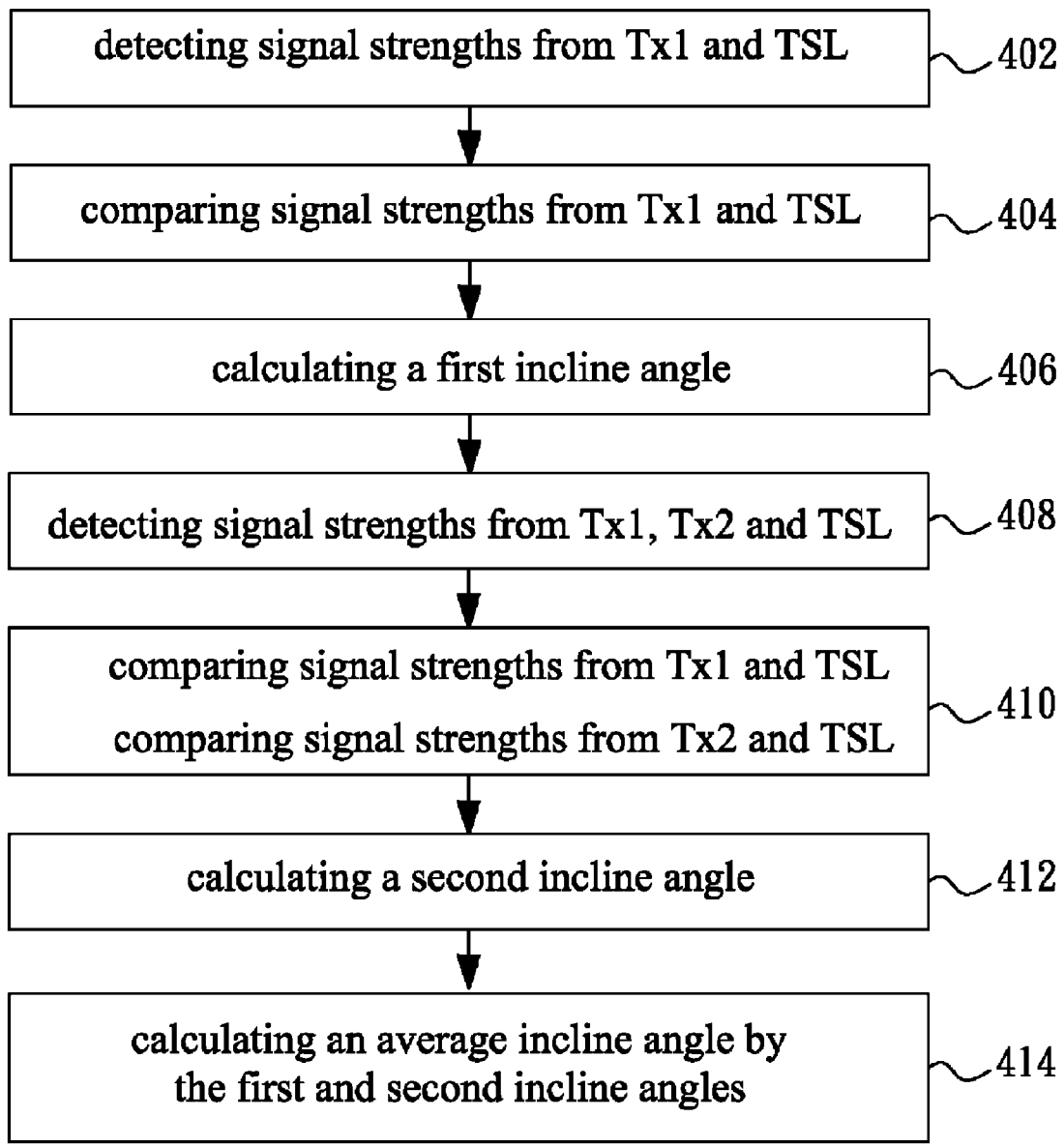
FIG. 4 is a flow chart of a method for calculating an incline angle of a capacitive stylus according to one embodiment of the invention.

FIG. 4 is a flow chart of a method for calculating an incline angle of a capacitive stylus according to one embodiment of the invention. In step 402, a step of detecting strengths of electric field signals from a first transmit electrode (Tx1) and a third transmit electrode (TSL) upon a touch panel is performed. Then in step 404, a step of comparing the strengths of electric field signals from the first transmit electrode (Tx1) and the third transmit electrode (TSL) is performed. Next in step 406, a first step of calculating an incline angle of a capacitive stylus by using the result of comparing the strengths of electric field signals from the first transmit electrode (Tx1) and the third transmit electrode (TSL) is performed. Then in step 408, a step of detecting strengths of electric field signals from the first transmit electrode (Tx1), a second transmit electrode (Tx2) and the third transmit electrode (TSL) upon a touch panel is performed. Next in step 410, steps of comparing the strengths of electric field signals from the first transmit electrode (Tx1) and the third transmit electrode (TSL) and comparing the strengths of electric field signals from the second transmit electrode (Tx2) and the third transmit electrode (TSL) are performed. A step of comparing the strengths of electric field signals from the first transmit electrode (Tx1) and the second transmit electrode (Tx2) can also be performed. Then in step 412, a second step of calculating an incline angle of the capacitive stylus by using the results of comparing the strengths of electric field signals from the first transmit electrode (Tx1) and the third transmit electrode (TSL) and comparing the strengths of electric field signals from the second transmit electrode (Tx2) and the third transmit electrode (TSL) is performed. Finally, in step 414, a step of calculating an average incline angle of the capacitive stylus via averaging the incline angles calculated by the first and second calculating steps. The method for calculating an incline angle of a capacitive stylus can be performed by executing computer readable instructions such as a firmware or a software stored in an non-transitory computer readable medium of an apparatus comprising a touch panel via a micro processor of the apparatus.

Although specific embodiments have been illustrated and described, it will be appreciated by those skilled in the art that various modifications may be made without departing from the scope of the present invention, which is intended to be limited solely by the appended claims.

What is claimed is:

1. A capacitive stylus signal transmitting and application method, comprising:
   providing a capacitive stylus on a touch panel, the capacitive stylus comprising a first transmit electrode, a second transmit electrode and a third transmit electrode;
   detecting strengths of electric field signals from the first transmit electrode and the third transmit electrode;
   comparing the strengths of electric field signals from the first transmit electrode and the third transmit electrode;
   calculating a first incline angle of the capacitive stylus according to a result of comparing the strengths of electric field signals from the first transmit electrode and the third transmit electrode;
   detecting strengths of electric field signals from the first transmit electrode, the second transmit electrode and the third transmit electrode;
   comparing the strengths of electric field signals from the first transmit electrode and the third transmit electrode and the strengths of electric field signals from the second transmit electrode and the third transmit electrode;

calculating a second incline angle of the capacitive stylus according to results of comparing the strengths of electric field signals from the first transmit electrode and the third transmit electrode and the strengths of electric field signals from the second transmit electrode and the third transmit electrode; and calculating an incline angle of the capacitive stylus according to the first incline angle and the second incline angle.

2. The method according to claim 1, wherein the strength of electric field signal from the first transmit electrode is larger than the strengths of electric field signals from the second transmit electrode and the third transmit electrode.

3. The method according to claim 1, wherein the electric field signals from the first transmit electrode, the second transmit electrode and the third transmit electrode comprise alternating electric field signals.

4. The method according to claim 3, wherein a frequency of the alternating electric field signal from the second transmit electrode is a multiple of a frequency of the alternating electric field signal from the first transmit electrode, and the multiple is preferably in a range from 2 to 9.

5. The method according to claim 3, wherein a frequency of the alternating electric field signal from the first transmit electrode is a multiple of a frequency of the electric field signal from the third transmit electrode, and the multiple is preferably more than 100.

6. The method according to claim 1, wherein the steps of detecting strengths of electric field signals from the first transmit electrode and the third transmit electrode and comparing the strengths of electric field signals from the first transmit electrode and the third transmit electrode are performed in a first time slot, and the second transmit electrode does not transmit any signal.

7. The method according to claim 1, wherein the step of detecting strengths of electric field signals from the first transmit electrode, the second transmit electrode and the third transmit electrode, and the steps of comparing the strengths of electric field signals from the first transmit electrode and the third transmit electrode, and comparing the strengths of electric field signals from the second transmit electrode and the third transmit electrode are performed in a second time slot.

8. The method according to claim 6 further comprising steps of detecting strengths of alternating electric field signals from the first transmit electrode and the third transmit electrode and comparing the strengths of alternating electric field signals from the first transmit electrode and the third transmit electrode performed in a third time slot, wherein a frequency of alternating electric field signal from the first transmit electrode in a third time slot is different to a frequency of alternating electric field signal from the first transmit electrode in the first time slot.

9. The method according to claim 8, wherein the second transmit electrode does not transmit any signal during the third time slot.

10. The method according to claim 8 further comprising a step of calculating a tip pressure level of the capacitive stylus according to a result of comparing the strengths of alternating electric field signals from the first transmit electrode and the third transmit electrode.

11. The method according to claim 1 further comprising steps of comparing the strengths of electric field signals from the first transmit electrode and the second transmit electrode and calculating a third incline angle of the capacitive stylus according to results of comparing the strengths of electric field signals from the first transmit electrode and the second transmit electrode.

12. A capacitive stylus, comprising:
a circuit board with a circuit thereon;
a first transmit electrode, a second transmit electrode and a third transmit electrode, wherein the first transmit electrode is adjacent to a tip of the capacitive stylus, and the third transmit electrode is configured to be located between the first transmit electrode and the second transmit electrode; and
an non-transitory computer readable medium on the circuit board storing executable computer readable instructions for performing a capacitive stylus signal transmitting method, comprising:
transmitting a first alternating electric field signal with a first frequency by the first transmit electrode and a third alternating electric field signal with a third frequency by the third transmit electrode, wherein the second transmit electrode does not transmit any signal during a first time slot;
transmitting the first alternating electric field signal with the first frequency by the first transmit electrode, a second alternating electric field signal with a second frequency by the second transmit electrode and the third alternating electric field signal with the third frequency by the third transmit electrode during a second time slot; and
transmitting a fourth alternating electric field signal with a fourth frequency by the first transmit electrode and the third alternating electric field signal with the third frequency by the third transmit electrode, wherein the second transmit electrode does not transmit any signal during a third time slot.

13. The capacitive stylus according to claim 12, wherein the second frequency is a multiple of the first frequency and the multiple is preferably in a range from 2 to 9.

14. The capacitive stylus according to claim 12, wherein the first frequency is a multiple of the third frequency and the multiple is preferably more than 100.

* * * * *